Oct. 20, 1959 M. D. McFARLANE ET AL 2,909,663

TRANSFORMER COUPLED IMPEDANCE MATCHING CIRCUITS

Filed July 11, 1957

INVENTORS
MAYNARD D. McFARLANE &
CECIL A. CRAFTS

BY Albert J. Henderson
ATTORNEY

United States Patent Office 2,909,663

Patented Oct. 20, 1959

2,909,663

TRANSFORMER COUPLED IMPEDANCE MATCHING CIRCUITS

Maynard D. McFarlane, Corona Del Mar, and Cecil A. Crafts, Pasadena, Calif., assignors to Robertshaw-Fulton Controls Company, Greensburg, Pa., a corporation of Delaware Application July 11, 1957, Serial No. 671,174

5 Claims. (Cl. 250—83.6)

Figure 1:
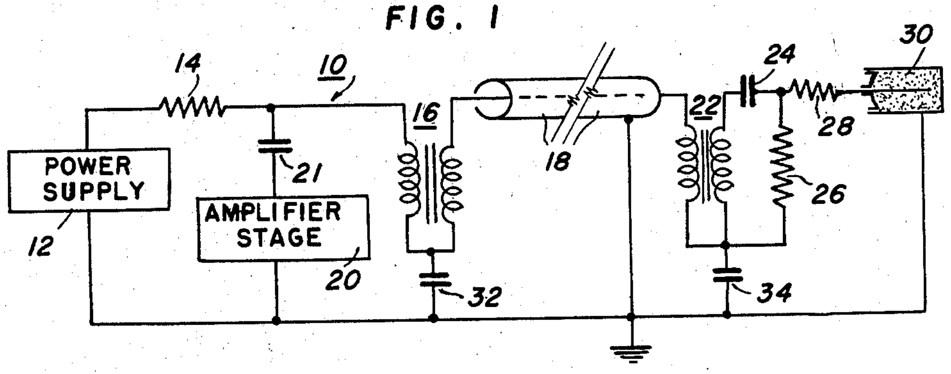

This invention relates to electronic instrumentation, and more particularly, to improvements in the type of electronic instrumentation which is employed in conjunction with equipment for detecting radioactive radiation.

In many known systems for detecting radioactivity, the need for conveying the output signals developed by the detector to a remotely situated measuring apparatus has presented an unusually difficult technical problem. Thus, where conventional high impedance systems have been used, the amount of distributed cable capacitance has been a factor which limited the physical spacing between the detector and the measuring apparatus. Since the cable capacitance is located within the high impedance circuit, and the amplitude of the pulse voltage is inversely proportional to circuit capacity, the effective output pulse delivered by the cable to remote amplifiers and associated circuitry always depends upon the length and size of the cable. Since the amount of cable varies from one installation to the next, it becomes impossible to proportion amplifier and circuitry constants with any degree of uniformity. The method by which the improved circuits of the present invention eliminate these disadvantages will be appreciated more fully as the detailed description proceeds.

Where low impedance circuits using transformer coupling have been employed, the reduced efficiency of the system has resulted in unsatisfactory overall performance. In this type of circuit, the wave train of discrete voltage pulses produced by a radiation detector is transformer-coupled both into and out of the cable. At the output end, the pulses are applied to conventional stages of amplification, and associated circuitry. Such low impedance circuits permit the use of extended cable lengths, which provides results superior in this respect to high impedance type circuits. However, because of the fact that the detector works into the low impedance of a transformer winding, the overall efficiency of the system is extremely poor. Thus, with this form of prior art circuit, the pulse height available for delivery to remote amplifier stages and the like is markedly lower than that obtainable with short cable lengths in the earlier discussed high impedance circuit. The present invention contemplates an arrangement whereby indefinitely long lengths of cable may be used, and the spacing between the detector and the instrumentation may be made as long as required without any necessity for tolerating distortion in the amplitude or waveform of the pulses transmitted through the cable.

In the improved circuits of the present invention, the desirable characteristics of low impedance and high impedance prior circuits have been retained, and the disadvantages have been eliminated. Additionally, the benefits accruing to the use of transformer-coupled low impedance circuits are received without any necessity for loading the detector with the primary impedance of the input transformer.

Accordingly, therefore, a primary object of this invention is to transmit the output of a pulse-type radiation detector for an indefinite distance without undesirable attrition in the form or amplitude thereof.

Another object of this invention is to convey voltage pulses to remotely situated stages of instrumentation without distortion in the magnitude or shape thereof.

A further object of this invention is to convey the output signals from a pulse-type radiation detector to a remotely situated amplifier stage.

A still further object of this invention is to eliminate substantially the effect of distributed cable capacitance on radioactivity measuring circuitry.

Figure 2:
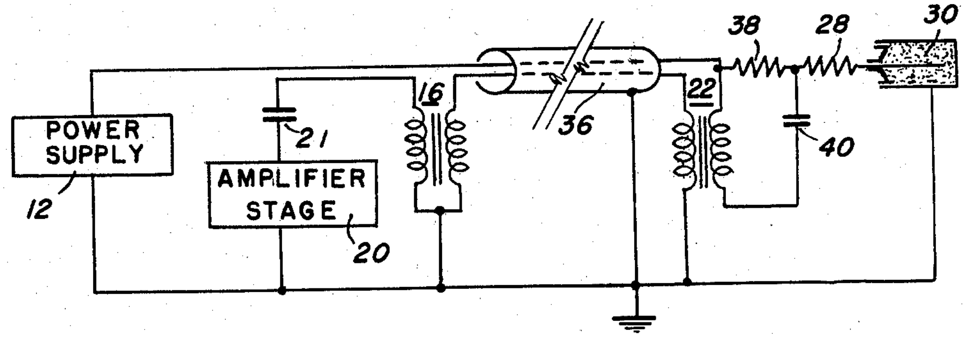

These and other objects and advantages of the present invention will become apparent by referring to the accompanying detailed description and drawings in which like numerals indicate like parts and in which:

Fig. 1 is a diagram showing one embodiment of the inventive circuitry disclosed in this specification; and Fig. 2 is a diagram showing a second embodiment of the inventive circuitry disclosed in this specification.

To expedite the explanation of the circuitry and components provided in the first embodiment of the invention, reference will now be made to the circuit generally designated by the numeral 10 in Fig. 1. In Fig. 1, the grounded power supply 12 is connected through resistor 14 and the series-connected primary and secondary coils of a transformer 16 to one end of the central conductor within a cable 18. The value of resistor 14 should be large in comparison with the input impedance of an amplifier stage 20 shown to the lower right thereof, and may range from 2 to 50 megohms. In practicing the invention, a value of 6.2 megohms for this resistor 14 yielded excellent results.

The opposite end of the central conductor of cable 18 is connected in series with primary and secondary windings of a transformer 22. The secondary winding of the transformer 22 is shunted by a capacitor 24 and a resistor 26 connected in series. The common junction between the capacitor 24 and resistor 26 is coupled, via resistor 28, to the central electrode of the radiation detector 30. The value of resistor 28 may range from 1 to 5 megohms. In practicing the invention, specific values of 2 megohms or 3.3 megohms were found to yield equally good results. The series-connected coils of the transformers 16 and 22 are tied to ground by means of high voltage capacitors 32 and 34, respectively.

In Fig. 1, the primary winding of transformer 22 is connected to capacitor 24 and resistor 28 rather than across the detector in the manner typical of prior art circuits. As a result, the voltage drop across the resistor 28 couples the electric pulses into the cable 18, via transformer 22. Because of this scheme of connections, the limitations on cable length which characterize high impedance systems are eliminated. Moreover, it is unnecessary to tolerate the reduced efficiency and unsatisfactory pulse amplitudes which characterize previously known forms of low impedance circuits.

By using a second embodiment of the invention, the high voltage capacitors 32 and 34 which tie the transformers to ground may be eliminated. For the purpose of explaining this embodiment of the invention, reference will now be made to Fig. 2 wherein the reference numeral 36 has been used to designate a form of co-axial cable which employs two inner conductors and a grounded metallic outer sheath. It should be appreciated in connection with the invention shown in Fig. 2 that a triaxial cable employing three spaced internal conductors within the cable may be employed in place of the grounded-sheath two conductor cable which is illustrated. The grounded power supply 12 is connected directly to one of the inner conductors within the cable 36. At the opposite end of the cable, this inner conductor is connected to the central electrode of the radiation detector 30, via the series-connected resistors 28 and 38.

The basic concept of exploiting the voltage drop across an element such as resistor 38 is again employed in this embodiment of the invention. Thus, the secondary winding of the transformer 22 is connected in shunt relationship with the resistor 38 and capacitor 40. The capacitor 40, it will be noted, is connected to the junction between resistors 28 and 38.

The primary winding of transformer 22 and the outer metallic container of the detector 30 are each connected to ground. At the opposite end of the cable, the inner conductor is transformer-coupled to the amplifier stage 20, via coupling capacitor 21. The amplifier stage and the common junction between the coils of the transformer 16 are provided with a ground connection. In this embodiment of the invention, the voltage drop across resistor 38 is used to couple the electric pulses into the cable 36.

By using the embodiment of the invention shown in Fig. 2, the limitations on cable length which characterize high impedance systems are eliminated. Moreover, the reduced efficiency and low pulse amplitudes which characterize low impedance systems need not be tolerated, and indefinitely long cable runs are made practical.

In practicing the present invention, pulse voltage amplitudes ten to twenty times greater than those obtainable from prior art circuits were readily generated. The circuits disclosed and claimed herein proved to be characterized by extremely stable operation, and substantially diminished error in the pulse voltage variation which accompanies changes in the counting rate. Additionally, substantially longer Geiger-Mueller plateaus were obtained by using the present invention, and the circuit operation proved to be relatively insensitive to temperature changes, ageing of components and changes in value of supply voltage.

It will be apparent to those skilled in the art that many modifications of the disclosed embodiments of this invention may be made without departing from the scope thereof which is to be measured by the appended claims.

We claim:

1. In a circuit for conveying the electrical signals from a plural element radiation detector to a remote site, a coaxial cable provided with a central conductor and a grounded sheath, a first transformer provided with a primary and a secondary coil both connected in series with one end of said central conductor, a second transformer provided with a primary and a secondary coil both connected in series with the opposite end of said central conductor, a series-connected resistor and a capacitor jointly coupled in shunt across said secondary coil of said second transformer, resistor means interconnected between an element of said radiation detector and the juncture between said resistor and capacitor, amplifier means connected to receive a signal from said first transformer means, and power supply means connected to supply operating potential to said circuit.

2. In a circuit provided with a radiation detector having at least one electrode, an amplifier stage, and a power supply for providing operating potential to said circuit, the combination which comprises a cable, first transformer means connected between one end of said cable and said amplifier stage to deliver electrical signals thereto, second transformer means provided with a plurality of coils connected in series with the opposite end of said cable a series-connected resistor and capacitor jointly coupled in shunt across one of said coils of said second transformer means, and resistor means conductively interconnected between an electrode of said detector and the juncture between said series-connected resistor and capacitor.

3. In a circuit provided with a plural electrode radiation detector, an amplifier stage, and a power supply for providing operating potential to said circuit, cable means provided with inner and outer conductors, plural winding transformer means connected in series with one end of said inner conductor, resistor means coupled in a shunt circuit across one winding of said last-mentioned transformer means, inductive means connected to couple a signal from the opposite end of said inner conductor into said amplifier stage, capacitive means connecting said transformer means and said inductive means to ground, and means interconnecting one electrode of said radiation detector to the ungrounded end of said resistor means to develop input electrical signals for said cable means thereacross.

4. In a circuit for conveying the electrical signals from a plural element radiation detector to a remote site, a plural conductor cable provided with at least two conductors and a grounded metallic sheath therearound, a first transformer provided with a primary and secondary coil connected in series with a first of said conductors, power supply means connected to one end of the other of said conductors, a second transformer provided with a grounded primary winding connected to the opposite end of said first conductor and a second winding connected at one end to said other conductor, a series-connected resistor and capacitor coupled in shunt across said second winding, resistor means interconnected between an element of said radiation detector and the juncture between said series-connected resistor and capacitor, amplifier means connected to receive a signal from said first transformer, and power supply means connected to supply operating potential to said circuit.

5. In a circuit provided with a radiation detector having at least one electrode, an amplifier stage, and a power supply for providing operating potential to said circuit, as well as plural conductor cable means for effecting transmission of power and signal potentials, first transformer means including a plurality of coils connected in series between said amplifier stage and one conductor within said cable, second transformer means including a first winding connected to the opposite end of said last-mentioned conductor, and a second winding connected to one end of a different conductor, a resistor and capacitor connected in parallel across said second winding, and means connecting the common juncture between said resistor and capacitor to an electrode of said radiation detector.

References Cited in the file of this patent

UNITED STATES PATENTS

| | | |
|---|---|---|
| 2,824,236 | Swift | Feb. 18, 1958 |
| 2,824,238 | Stellmacher | Feb. 18, 1958 |